United States Patent [19]

Waller et al.

[11] Patent Number: 4,950,023
[45] Date of Patent: Aug. 21, 1990

[54] AUTOMOTIVE ARM REST

[76] Inventors: Edward Waller, 9440 Fontainebleu Blvd. #303, Miami, Fla. 33172; Ramon Mendez, 7053 SW. 22 St., Miami, Fla. 33155

[21] Appl. No.: 309,487

[22] Filed: Feb. 13, 1989

[51] Int. Cl.$^5$ .............................................. B60J 9/00
[52] U.S. Cl. ........................................ 296/153; 40/591; 297/413
[58] Field of Search ................ 296/153; 40/591, 600, 40/649; 297/412, 413; 248/118; 224/277

[56] References Cited

U.S. PATENT DOCUMENTS

| | | | |
|---|---|---|---|
| 1,371,678 | 3/1921 | Gerkin | 40/591 |
| 2,543,605 | 2/1951 | Smith | 40/591 |
| 2,670,235 | 2/1954 | Susil | 296/153 |
| 2,738,220 | 3/1956 | Simmons | 296/153 |
| 2,803,493 | 8/1957 | Haefliger | 296/153 |
| 2,877,049 | 3/1959 | Lucas | 296/153 |
| 2,994,356 | 8/1961 | Fleming | 296/136 |
| 3,170,714 | 2/1965 | Stalker | 296/153 X |
| 3,372,503 | 3/1968 | Weeks | 40/591 X |
| 3,603,637 | 9/1971 | DePinto | 296/153 |
| 3,826,026 | 7/1974 | Bevan | 40/649 X |
| 4,708,393 | 11/1987 | Fallis et al. | 297/452 |
| 4,758,043 | 7/1988 | Reynaldos | 296/153 |
| 4,805,957 | 2/1989 | Fletcher | 296/153 |

Primary Examiner—Dennis H. Pedder
Attorney, Agent, or Firm—Leon Gilden

[57] ABSTRACT

An automotive arm rest is set forth for securement to a window sill of an automotive door. The automotive arm rest comprises a plurality of elongate expandable chambers positioned adjacent an upper edge of the arm rest. A plurality of generally flexible "L" shaped clips project upwardly of the arm rest for securement within the automotive sill. A series of pockets for selective positioning of weights therein are formed along lowermost side and bottom edges of the arm rest to enhance positionment and alignment of the arm rest adjacent an exterior surface of an associated automotive door. A plurality of transparent message-receiving pockets are positioned parallel to the pneumatic chambers for receiving advertising and slogan literature therewithin. Further, flexible magnetic strips are fixedly secured to the interior surface edges of the arm rest for securement adjacent an automotive door.

1 Claim, 1 Drawing Sheet

U.S. Patent  Aug. 21, 1990  4,950,023
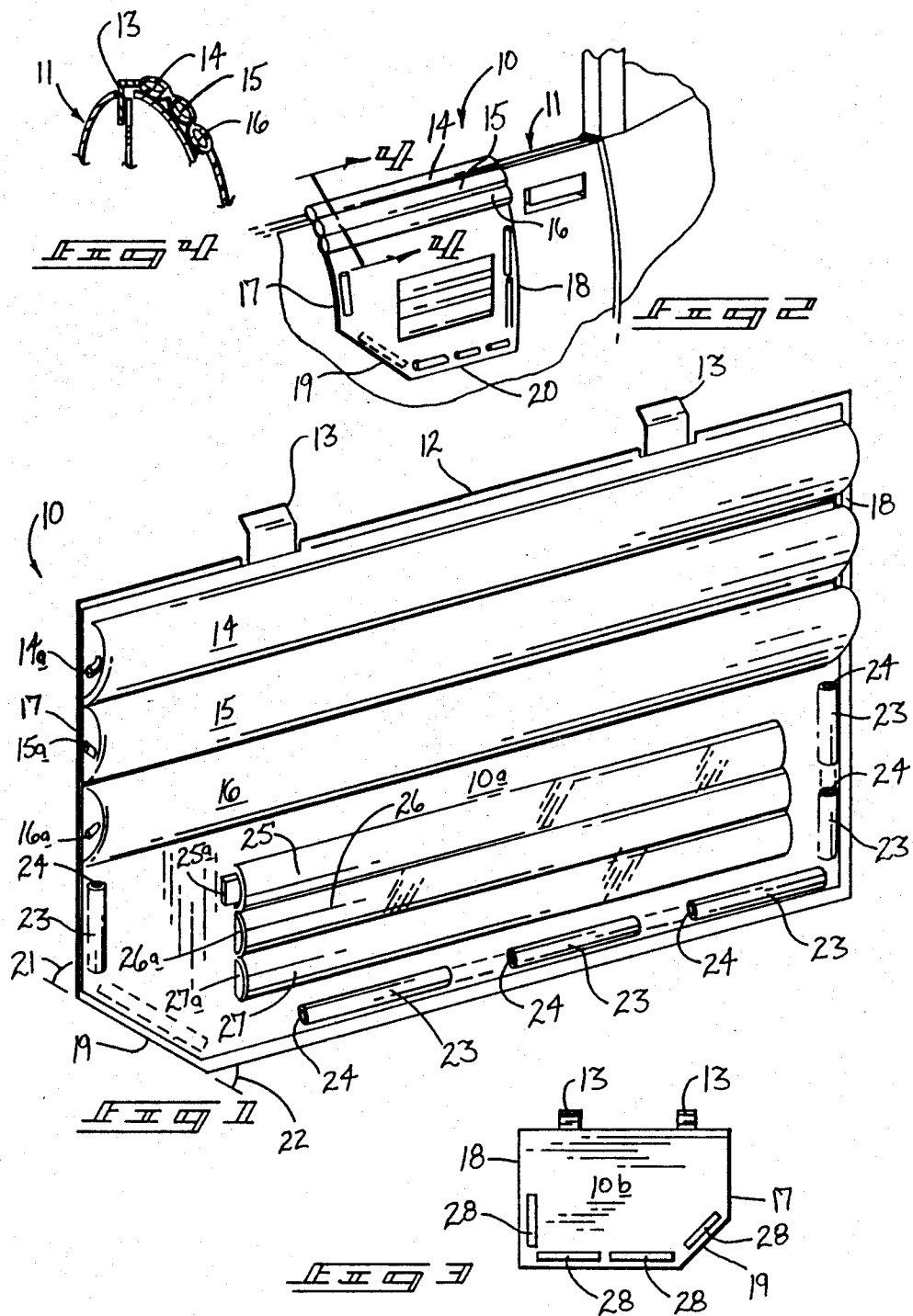

# AUTOMOTIVE ARM REST

BACKGROUND OF THE INVENTION

1. Field of the Invention

The field of invention relates to automotive arm rests, and more particularly pertains to a new and improved automotive arm rest wherein the same may be pneumatically configured to accommodate varying requirements of a spectrum of individuals.

2. Description of the Prior Art

The use of automotive arm rests is well known in the prior art. The arm rests are positioned to enhance comfort of a driver or passenger of an automotive vehicle attempting to rest an arm overlying a window frame. Positioning of an arm immediately over a window frame subjects the driver's arm to the residue of the sealing material associated with automotive windows, as well as dirt and debris trapped thereon. Further, the automotive frame work lacks the comfort of a padded member as well as insulating an individual's arm from the thermal transmission of heat or cold directed through the typical metal surface of an automotive door.

For example, U.S. Pat. No. 2,670,235 to Susil sets forth an automobile window rest provided with a padded upper surface for overlying engagement with the window sill and for securement with a channel therein. The arm rest of Susil is of a pre-formed configuration of a predetermined resiliency and further lacks the protective covering skirt of the instant invention overlying an extensive surface of the exterior of the automotive door.

U.S. Pat. No. 2,738,220 to Simmons sets forth an arm rest for use with an automotive window sill wherein the same provides for an arcuate member overlying the window sill channel with a pivoted portion for accommodating the raising and lowering of the associated window.

U.S. Pat. No. 2,877,049 to Lucas sets forth an arm rest for an automobile window wherein the arm rest is clipped to molding adjacent the sill and may be draped over the sill as desired. The Lucas arm rest includes the same deficiencies as other prior art devices in providing for an arm rest of fixed resiliency, as opposed to the instant invention enabling selective pneumatic filling of the pneumatic chambers. Further, the instant invention provides for selectively removable weights to secure the arm rest adjacent the exterior surface of the automotive door.

U.S. Pat. No. 3,170,714 to Stalker sets forth an extensible member for securement to a sill of a motor vehicle trunk which may be extended to protect clothing and the like positioned on the floor of the automotive trunk.

U.S. Pat. No. 3,603,637 to DePinto sets forth an adjustable arm rest for automobiles wherein two generally "U" shaped brackets may be secured within the opening of an automotive door and are provided with an arm rest adjustably secured between the two "U" shaped brackets to accommodate an arm thereon.

As such, it may be appreciated that there continues to be a need for a new and improved automotive arm rest which addresses both the problems of adjustably modifying resilience of the arm rest and further including weighted and magnetic securement means for maintaining the arm rest adjacent an exterior surface of an automotive door.

SUMMARY OF THE INVENTION

In view of the foregoing disadvantages inherent in the known types of automotive arm rests now present in the prior art, the present invention provides an automotive arm rest wherein the same may be compactly stored during periods of non-use and may be further easily and efficiently secured to an existing automobile door when desired. As such, the general purpose of the present invention, which will be described subsequently in greater detail, is to provide a new and improved automotive arm rest which has all the advantages of the prior art automotive arm rests and none of the disadvantages.

To attain this, the present invention comprises an automotive arm rest including a plurality of tabs for securement within an existing window channel of an automotive door at an upper edge of the automotive arm rest. A series of elongate pneumatic chambers are selectively and pneumatically filled to adjust stiffness of the pneumatic chambers and associated comfort. Further, a series of advertising pockets to contain slogans and the like are positioned underlying the pneumatic chambers about the upper surface of the arm rest with a series of pockets about a lower periphery of the arm rest containing selectively removable weights for maintaining the arm rest in position and contiguous contact with an automotive door's outer surface. Pliable magnetic strips are secured to lower peripheral interior edges of the arm rest to enhance the securement of the arm rest adjacent to the automotive door's surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive arm rest which has all the advantages of the prior art automotive arm rests and none of the disadvantages.

It is another object of the present invention to provide a new and improved automotive arm rest which may be easily and efficiently manufactured and marketed.

It is a further object of the present invention to provide a new and improved automotive arm rest which is of a durable and reliable construction.

An even further object of the present invention is to provide a new and improved automotive arm rest which is susceptible of a low cost of manufacture with regard to both materials and labor, and which accordingly is then susceptible of low prices of sale to the consuming public, thereby making such automotive arm rests economically available to the buying public.

Still yet another object of the present invention is to provide a new and improved automotive arm rest which provides in the apparatuses and methods of the prior art some of the advantages thereof, while simultaneously overcoming some of the disadvantages normally associated therewith.

Still another object of the present invention is to provide a new and improved automotive arm rest wherein the same may be modified to provide varying support stiffness and associated comfort therewith.

Yet another object of the present invention is to provide a new and improved automotive arm rest provided with selectively removable weights and magnets to enhance the securement of the arm rest adjacent an exterior surface of an automotive door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the instant invention positioned adjacent an exterior surface of an automotive door.

FIG. 3 is a rear orthograhic view taken in elevation of the interior surface of the automotive arm rest.

FIG. 4 is an orthographic view taken along the lines 4—4 of FIG. 2 in the direction indicated by the arrows.

DESCRIPTION OF THE PREFERRED EMBODIMENT

With reference now to the drawings, and in particular to FIGS. 1 to 4 thereof, a new and improved automotive arm rest embodying the principles and concepts of the present invention and generally designated by the reference numeral 10 will be described.

More specifically, the automotive arm rest 10 of the instant invention is configured for selective securement to an exterior surface of an automotive door 11 wherein a plurality of integral "L" shaped spring fingers extend outwardly and orthogonally of an upper elongate terminal edge 12 of the automotive arm rest 10. The arm rest 10 is formed with an outer surface 10a and an inner surface 10b for contiguous overlying relationship to the door 11. The door 11 is formed with a channel, as illustrated in FIG. 4, wherein the automotive window reciprocatably is mounted. The spring fingers 13 are inserted within the channel and thereafter the automotive arm rest 10 is positioned in overlying relationship to the door 11. The arm rest 10 is further formed of flexible polymeric or fabric material to ensure flexibility of the organization to accommodate various surfaces of a door 11.

Positioned adjacent to the upper elongate terminal edge 12 and extending between right and left respective terminal edges 17 and 18 lies a series of respective first, second, and third elongate pneumatic chambers 14, 15, and 16 respectively, wherein each is formed with a respective first, second, and third oral inflation valve 14a, 15a, and 16a of conventional construction to permit selective inflation of the various pneumatic chambers to a desired level of inflation.

The right terminal edge 17 is normally positioned proximate a forwardmost edge of a door 11 and is formed with a lower forward transition edge 19 extending downwardly to a lower terminal edge 20. The transition edge 19 is formed at 45 degree angles 21 to the right and lower transition edges 20. The transition edge 19 is formed at this configuration to accommodate irregular door shapes wherein a lowermost hinge is positioned rearwardly of an upper hinge in an automotive environment.

Formed to the outer surface 10a of the automotive arm rest 10 are a series of transparent pockets comprising a first, second, and third transparent pocket 25, 26, and 27 respectively, each formed with respective first, second, and third openings 25a, 26a, and 27a at forward distal ends thereof to accept messages, slogans, and advertising therein for display purposes by a user of the arm rest 10.

Formed about a lowermost perimeter of the outer surface 10a are a series of lower pockets 23 of generally tubular configuration to accept a series of weighted metallic cylinders 24 selectively therewithin. The weighted cylinders enhance the positioning of the arm rest 10 against the surface of an associated door 11. The pockets 23 are formed below the series of pneumatic chambers, as illustrated in FIGS. 1 and 2 for example.

Formed to the inner surface 10b at lowermost perimeter edges of the automotive arm rest are a series of flexible magnetic strips 28, as illustrated in FIG. 3, for securement of the automotive arm rest 10 against the automotive door 11. The cooperative effect of the magnets 28 and the weighted metallic cylinders 24 maintain the securement of the lower flap portion of the automotive arm rest 20 underlying the pneumatic chambers 14.

The manner of usage of operation of the instant invention therefore should be apparent from the above description and accordingly no further discussion relative to the manner of usage and operation of the instant invention shall be set forth.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive arm rest device for selective securement to a window channel of an automotive door for overlying an outer surface of said door wherein said device comprises,
   a flexible pad including an upper terminal edge, a right terminal edge, a left terminal edge, and a lower terminal edge; and
   a plurality of finger members integrally secured to and extending outwardly of said upper terminal edge, and
   chamber means positioned adjacent said upper terminal edge in an exterior surface of said flexible pad and extending between said right and left terminal edges for resiliently accommodating an individual's arm thereon, and
   stabilizing means positioned along a lower terminal edge of said flexible pad for maintaining said flexible pad in an extended orientation when secured to said automotive door, and
   at least one pocket means secured to said exterior surface for accepting and displaying a message, and
   wherein said chamber means comprises a plurality of elongate pneumatic chambers, each chambers formed with an inflation valve for inflating each chamber to a selective predetermined pressure, and
   wherein said pocket means includes a plurality of transparent elongate pockets formed with an opening at an end thereof for receiving said message within said pocket, and
   wherein said finger members each include an elongate flexible generally "L" shaped finger for securement within the window channel of said door, and
   wherein said stabilizing means comprises a series of elongate generally cylindrical pockets extending along said lower terminal edge and said right and left terminal edges each formed with an opening including a cylindrical weighted member of complementary exterior configuration to an interior configuration defined by each pocket wherein each weighted member is selectively receivable within each pocket for maintaining said flexible pad in an extended orientation, and
   wherein a plurality of flexible magnetic strips are secured to a lowermost peripheral edge of said flexible pad and secured on an interior surface of said pad for magnetically attracting said flexible pad to said automotive door, and
   further including a forward transition edge formed between said right terminal edge and said lower terminal edge and formed at 45 degree angles relative to said right terminal edge and lower terminal edge to define a relief to accommodate automotive doors of tapered configuration, and
   wherein said transparent pockets are generally parallel to and positioned between said pneumatic chambers and said stabilizing means.

* * * * *